(12) United States Patent
Schwartz et al.

(10) Patent No.: US 12,401,227 B1
(45) Date of Patent: Aug. 26, 2025

(54) INDUCTIVE POWER TRANSFER SYSTEM WITH COMMON MODE CHANNEL COMMUNICATION

(71) Applicant: Apple Inc., Cupertino, CA (US)

(72) Inventors: Adam L. Schwartz, Redwood City, CA (US); Ye Li, Santa Clara, CA (US); Rohan Dayal, Daly City, CA (US)

(73) Assignee: Apple Inc., Cupertino, CA (US)

( * ) Notice: Subject to any disclaimer, the term of this patent is extended or adjusted under 35 U.S.C. 154(b) by 292 days.

(21) Appl. No.: 17/804,955

(22) Filed: Jun. 1, 2022

Related U.S. Application Data

(62) Division of application No. 17/022,835, filed on Sep. 16, 2020, now abandoned.

(60) Provisional application No. 62/982,850, filed on Feb. 28, 2020.

(51) Int. Cl.
| | |
|---|---|
| *H02J 50/80* | (2016.01) |
| *H02J 50/10* | (2016.01) |
| *H02J 50/12* | (2016.01) |
| *H02J 50/70* | (2016.01) |
| *H04B 5/26* | (2024.01) |
| *H04B 5/79* | (2024.01) |

(52) U.S. Cl.
CPC ............ *H02J 50/12* (2016.02); *H02J 50/10* (2016.02); *H02J 50/70* (2016.02); *H02J 50/80* (2016.02); *H04B 5/266* (2024.01); *H04B 5/79* (2024.01)

(58) Field of Classification Search
CPC . H02J 50/00; H02J 50/70; H02J 50/80; H04B 5/00
See application file for complete search history.

(56) References Cited

U.S. PATENT DOCUMENTS

| | | |
|---|---|---|
| 11,050,307 B1 | 6/2021 | Qiu et al. |
| 2013/0260676 A1 | 10/2013 | Singh |
| 2014/0073243 A1 | 3/2014 | Hijioka et al. |
| 2015/0004907 A1* | 1/2015 | Subramoniam ...... H04B 5/0031 455/41.1 |
| 2020/0343765 A1 | 10/2020 | Kwon et al. |
| 2021/0033662 A1* | 2/2021 | Al-Shyoukh ...... H01R 13/6461 |

FOREIGN PATENT DOCUMENTS

| | | | |
|---|---|---|---|
| CN | 103686867 A | 3/2014 | |
| CN | 111669170 A | * 9/2020 | ......... H03K 19/0175 |
| JP | 2017195363 A | * 10/2017 | ......... H01F 17/0013 |

* cited by examiner

*Primary Examiner* — Adi Amrany
(74) *Attorney, Agent, or Firm* — FLETCHER YODER PC

(57) ABSTRACT

A wireless power transfer transmitter can include a transmitter coil configured to deliver power to an inductively coupled receiver coil in a wireless power transfer receiver, a power converter configured to drive the transmitter coil, and means for driving the transmitter coil with a common-mode coupled communication signal to the wireless power transfer receiver. The means for driving the transmitter coil with the common-mode coupled communication signal to the wireless power transfer receiver can include a common mode signal driver configured to receive a data input signal and generate therefrom a signal to be injected into the transmitter coil. Alternatively, the means for driving the transmitter coil with the common-mode coupled communication signal to the wireless power transfer receiver can include a controller configured to drive the inverter with alternating complementary duty cycles.

20 Claims, 5 Drawing Sheets

INDUCTIVE POWER TRANSFER SYSTEM WITH COMMON MODE CHANNEL COMMUNICATION

CROSS-REFERENCE TO RELATED APPLICATIONS

This application is a divisional of U.S. patent application Ser. No. 17,022,835, filed Sep. 16, 2020; and claims priority to and benefit of U.S. Provisional Application No. 62/982,850, filed Feb. 28, 2020, both entitled "INDUCTIVE POWER TRANSFER SYSTEM WITH COMMON MODE CHANNEL COMMUNICATION," which are incorporated herein by reference in their entirety for all purposes.

BACKGROUND

Some modern personal electronic devices are designed to facilitate inductive power transfer for applications such as battery charging. In various applications, it is desirable for the inductive power transmitter to communicate power transfer status with the inductive power receiver (and vice-versa). In-band and out-of-band communication techniques are possible. In general, the out-of-band techniques requires separate communication channels, including additional physical components and introducing significant additional complexity into both the inductive power transmitters and inductive power receivers. Alternatively, in-band communication techniques rely on modifications of the power signals transmitted from transmitter to receiver, which may, in some cases, interfere with optimized power transfer.

SUMMARY

It is desirable to provide for in-band communication between an inductive power transmitter and receiver that minimized or eliminated disruption of the inductively transmitted power.

A wireless power transfer transmitter can include a transmitter coil configured to deliver power to an inductively coupled receiver coil in a wireless power transfer receiver, a power converter configured to drive the transmitter coil, and means for driving the transmitter coil with a common-mode coupled communication signal to the wireless power transfer receiver. The means for driving the transmitter coil with the common-mode coupled communication signal to the wireless power transfer receiver can include a common mode signal driver configured to receive a data input signal and generate therefrom a signal to be injected into the transmitter coil. The transmitter coil can be a split coil, and the common mode signal driver can be coupled to a junction point of the split transmitter coil. The common mode signal driver can be capacitively coupled to the junction point of the split transmitter coil. In other embodiments, the wireless power transmitter can include an electrical shield configured to prevent stray electrical field coupling to the transmitter winding, and the common mode signal driver is coupled to the electrical shield.

In some embodiments, the power converter can be an inverter, and the means for driving the transmitter coil with the common-mode coupled communication signal to the wireless power transfer receiver can include a controller configured to drive the inverter with alternating complementary duty cycles. The alternating complementary duty cycles may generate respective common mode voltages. In some, but not necessarily all, embodiments, the transmitter may be configured to deliver rated power at a duty cycle less than 25%, and in some cases less than 20%.

A wireless power transfer receiver can include a receiver coil configured to receive power from an inductively coupled transmitter coil in a wireless power transfer transmitter, converter circuitry coupled to the receiver coil and configured to convert the received power to power a load, and communication circuitry coupled to the receiver coil and configured to receive a common mode coupled communication signal received at the receiver coil. The communication circuitry can include a common mode signal detector, which may be configured to detect a common mode voltage and/or a common current. The communication circuitry can further include a filter configured to filter the detected common mode signal. The communication circuitry can further include a demodulator configured to receive the filtered, detected common mode signal and generate a data output. The wireless power transfer receiver can further include a split receiver coil. The wireless power receiver an further include an electrical shield configured to prevent stray electrical field coupling to the receiver winding, and the common mode signal detector may be coupled to the electrical shield.

A method of transmitting a communication signal from a wireless power transmitter to a wireless power receiver can include driving a transmitter coil of the wireless power transmitter so as to generate a signal that is common mode coupled to a receiver coil of the wireless power receiver. Driving the transmitter coil so as to generate a signal common mode coupled to the receiver coil can include driving the transmitter coil with an inverter having alternating, complementary duty cycles. Driving the transmitter coil can additionally or alternatively include injecting a signal into the transmitter coil. The transmitter coil can be a split coil, and injecting a signal comprises injecting a signal at a junction point of the split coil. The transmitter can also include an electrical shield, and injecting a signal can include injecting a signal to the electrical shield.

DETAILED DESCRIPTION

Figure 1A:
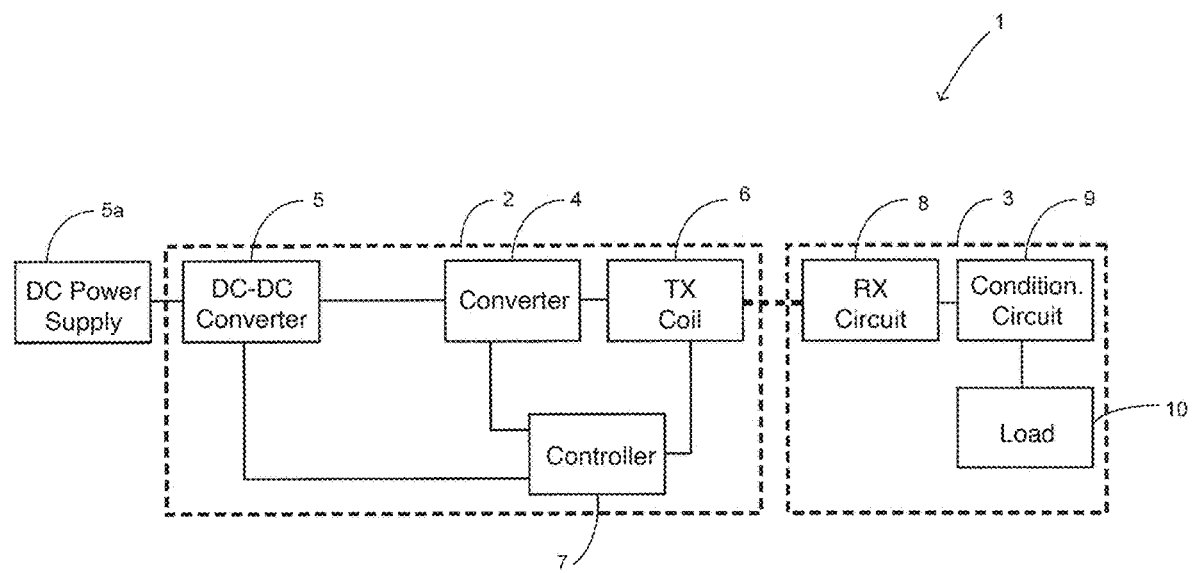
FIG. 1A shows a representation of an inductive power transfer (IPT) system.

In the following description, for purposes of explanation, numerous specific details are set forth to provide a thorough understanding of the disclosed concepts. As part of this description, some of this disclosure's drawings represent structures and devices in block diagram form for sake of simplicity. In the interest of clarity, not all features of an actual implementation are described in this disclosure. Moreover, the language used in this disclosure has been selected for readability and instructional purposes, has not been selected to delineate or circumscribe the disclosed subject matter. Rather the appended claims are intended for such purpose.

Various embodiments of the disclosed concepts are illustrated by way of example and not by way of limitation in the accompanying drawings in which like references indicate similar elements. For simplicity and clarity of illustration, where appropriate, reference numerals have been repeated among the different figures to indicate corresponding or analogous elements. In addition, numerous specific details are set forth in order to provide a thorough understanding of the implementations described herein. In other instances, methods, procedures and components have not been described in detail so as not to obscure the related relevant function being described. References to "an," "one," or "another" embodiment in this disclosure are not necessarily to the same or different embodiment, and they mean at least one. A given figure may be used to illustrate the features of more than one embodiment, or more than one species of the disclosure, and not all elements in the figure may be required for a given embodiment or species. A reference number, when provided in a given drawing, refers to the same element throughout the several drawings, though it may not be repeated in every drawing. The drawings are not to scale unless otherwise indicated, and the proportions of certain parts may be exaggerated to better illustrate details and features of the present disclosure.

A wireless power system can include a wireless power transmitting device (which may also be referred to in some instances as a wireless power transmitter or an inductive power transmitter) that can transmit power wirelessly to a wireless power receiving device (which may also be referred to in some instances as a wireless power receiver or an inductive power receiver). The wireless power transmitting device can include a device such as a wireless charging mat, wireless charging puck, wireless charging stand, wireless charging table, or other wireless power transmitting equipment. The wireless power transmitting device may be a stand-alone device or built into other electronic devices such as a laptop or tablet computer, cellular telephone, or other electronic device. The wireless power transmitting device may have one or more coils that may be used in transmitting wireless power to one or more wireless power receiving coils in the wireless power receiving device. The wireless power receiving device may be a device such as a cellular telephone, watch, media player, tablet computer, pair of earbuds, remote control, laptop computer, electronic pencil or stylus, other portable electronic device, or other wireless power receiving equipment.

During operation, the wireless power transmitting device may supply alternating current signals to one or more wireless power transmitting coils. This may cause the coils to generate an alternating magnetic field and to transmit alternating-current electromagnetic signals (sometimes referred to as wireless power signals) to one or more corresponding coils in the wireless power receiving device. Rectifier circuitry in the wireless power receiving device can convert the received wireless power signals into direct current (DC) power for powering the wireless power receiving device.

Wireless power transmitting and receiving devices may be designed to cooperate specifically with each other. For example, the size, shape, number, dimensions and configuration of coils of one or both of the devices may be selected at least in part based on the other device. Magnetic elements may also be included in the transmitting and/or receiving device, and the size, shape, number, dimensions and configuration of the magnetic elements may be selected based at least in part on the other device.

In some cases, wireless power transmitting and receiving devices can be designed to be closely coupled to each other. Typically, this is achieved by arranging the coils of the transmitting and receiving devices such that they are aligned with and close to each other in use. Systems in which the transmitting and receiving devices can be closely coupled to each other in use are sometimes referred to as inductive power transfer systems. Transmitting and receiving devices that can be closely coupled to receiving devices can be referred to as inductive power transfer devices.

Wireless power transmitting and receiving devices can also be designed to cooperate with each other in particular orientations, positions or other spatial relationships. For example, some receiving devices may have a preferred position or orientation with respect to a transmitting device. This preferred position or orientation may allow for good wireless power transfer, minimum leakage of the magnetic field and other advantageous effects. The transmitting and/or receiving devices may have visual markings to indicate where or in what orientation to place the receiving device, engaging elements to hold the receiving device in a particular position or orientation, magnetic couplings or other biasing elements to urge the receiving device towards a particular position or orientation, or other arrangements.

Wireless power transmitting and receiving devices can also be used with other devices without being specifically designed to cooperate with them. For example, a wireless power transmitting device can operate with many different types of receiving devices having different coil arrangements, different (or no) magnetic elements, sizes, shapes, and other characteristics. A wireless power receiving device can operate with many different types of transmitting devices having different coil arrangements, different (or no) magnetic elements, sizes, shapes and other characteristics.

Wireless power transmitting and receiving devices can also be used in various orientations, positions, or other spatial relationships. For example, wireless power transmitting or receiving devices may be provided without visual markings, engaging elements, magnetic couplings, other biasing elements, or other arrangements. Alternatively, transmitting or receiving devices may have these arrangements but still operate in various other orientations and positions.

The term "coil" may include an electrically conductive structure in which an electrical current generates a magnetic field or vice-versa. For example, inductive "coils" may be electrically conductive wire in three dimensional shapes or two dimensional planar shapes, electrically conductive material fabricated using printed circuit board (PCB) techniques into two dimensional shapes or into three dimensional shapes over plural PCB "layers," and other coil-like shapes. The coil may have two or more connections. For example, three coil connections could be provided using a center tapped coil, thereby allowing several voltages levels to be provided. The use of the term "coil" in either singular or plural is not meant to be restrictive in this sense. Any of a variety of configurations may be used depending on the particular application. The use of the term "coil" alone, in either singular or plural, is not meant to be restrictive in this sense.

FIG. 1A shows a representation of an inductive power transfer (IPT) system 1 according to an example embodiment. This representation is intended to be general representation so as to introduce different parts of the IPT system that will be described in more specific detail in relation to later figures. This may be suitably modified or supplemented for particular embodiments according to the application. The illustrated IPT system includes an inductive power transmitter 2 and an inductive power receiver 3.

Illustrated transmitter 2 includes a converter 4 that may be connected to an appropriate power supply. In FIG. 1A the power supply is shown as a DC-DC converter 5 that is connected to a DC power supply 5a; however, other arrangements are possible. The converter may be a non-resonant half bridge converter or any other converter adapted for the particular IPT system, such as a push-pull converter. The converter may be configured to output an alternating current of desired frequency and amplitude. The voltage of the output of the converter may also be regulated by the converter, the DC-DC converter, or combination of both.

The converter 4 may be connected to transmitting coil(s) 6. Converter 4 may supply the transmitting coil(s) 6 with an alternating current such that the transmitting coil(s) 6 generates a time-varying magnetic field with a suitable frequency and amplitude. In some configurations, the transmitting coil(s) 6 may also be considered to be an integral part of the converter 4.

The transmitting coil(s) 6 may be any suitable configuration of coils, depending on the characteristics of the magnetic field that are required in a particular application and the particular geometry of the transmitter. In some IPT systems, the transmitting coils 6 may be connected to capacitors (not shown) to create a resonant circuit. Where there are multiple transmitting coils, these may be selectively energized so that only transmitting coils in proximity to suitable receiving coils are energized. In some IPT systems, it may be possible that more than one receiver 3 may be powered simultaneously. In IPT systems, where the receivers 3 are adapted to control the power provided to the load, the multiple transmitting coils 6 may be connected to the same converter 4. This has the benefit of simplifying the transmitter 2, as it does not need to control each transmitting coil 6 separately. Further, it may be possible to configure the transmitter 2 so that it regulates the power provided to the transmitting coils 6 to a level dependent on the coupled receiver 3 with the highest power demands.

FIG. 1A also shows a controller 7 within the transmitter 2. The controller 7 can be connected to various components of the transmitter 2. The controller 7 may be adapted to receive inputs from the various components of transmitter 2 and produce outputs that control operation of the various components. The controller 7 may include a memory. The controller 7 may be may be one or more of a microprocessor, microcontroller, programmable logic controller, field programmable gate array (FPGA), or similar controller that may be programmed to perform different computational tasks depending on the requirements depending on the requirements of the IPT system.

The receiver 3 includes power receiving circuitry 8, which can include one or more receiver coils 13 (FIGS. 1B & 1C) suitably connected to power conditioning circuitry 9. Power conditioning circuitry 9 can in turn supply power to a load 10. The power conditioning circuit 9 may be configured to convert current induced in the receiver coils 13 into a form that is appropriate for the load 10. As will be appreciated, the power receiver 3 may receive inductive power from the power transmitter 2 and provides the power to the load 10.

The load 10 may be any suitable load depending upon the application for which the inductive power receiver 2 is being used. For example, the load 10 may be a portable electronic device or a battery that requires charging.

The power demands of a load 10 may vary, therefore it may be desirable that the power provided to the load 10 matches what is required for normal and safe operation. In particular, the power supplied to a load 10 must be sufficient to meet the power demands while not being excessive, which may lead to undesired effects such as inefficiency and heating. Accordingly, power conditioning circuitry 9 may be incorporated into the receiver 3 to meet the electrical requirements of the load. Power conditioning circuitry 9 may include rectifiers, regulators, smoothing circuits, control circuits, and the like.

Figure 1B:
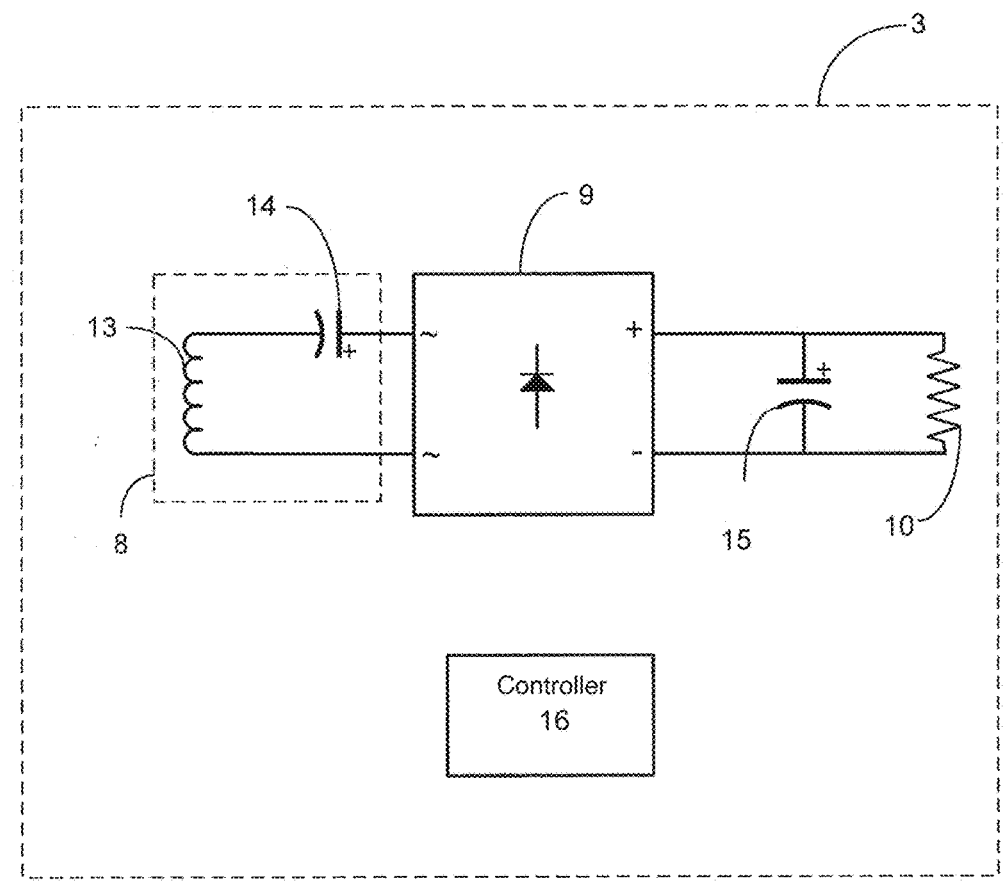
FIG. 1B illustrates an example circuit topology of an inductive power receiver.

FIG. 1B illustrates an example circuit topology of an inductive power receiver 3. The illustrated circuit includes power receiving circuitry 8 including a receiving coil 13 shown as an inductor and a capacitor 14. The output of power receiving circuitry 8 may be provided to a rectification circuit 9 that operates to convert received oscillating voltages into DC voltages suitable for providing power to a load 10. The rectification circuit 9 may be a full bridge or half bridge circuit. Embodiments of the rectifier may be constructed with asymmetric current flow devices, diodes, or controlled switches or a combination of any suitable asymmetric current flow devices such as diodes and controlled switches. Controlled switches may provide improved performance over diodes but they must be controlled so that they are switched on and off to control the flow of current. Possible controlled switches include any transistors such as MOSFETs, IGBTs or BJTs as well as thyristors (SCRs). A load 10 and a DC smoothing capacitor 15 are shown connected to the output of the rectification circuit 9.

The coil 13 and capacitor 14 together can form a circuit receptive to the inductive power transmission field. In some configurations, the coil 13 and capacitor 14 may be tuned to resonate at or close to frequency of field oscillation of the inductive power transmitter. However, in other configurations the resonant circuit may be tuned for reception to a wide range of inductive power transmission field frequencies. In some embodiments, it may be desirable to have one or more additional coils and/or capacitors to form additional resonant circuits. For simplicity, power receiver 3 of FIG. 1B is shown with one receiver resonant circuit 12. However, there may be multiple receiver resonant circuits configured to operating independently or in parallel. For example, in some portable devices there may be receiving coils located on different parts of the portable device. The resonant circuits may all be connected to power regulation and conditioning circuitry, or they may each be connected with associated receiver circuitry such as inverters either driven in-phase or out-of-phase to provide a multiphase system. In some embodiments, the circuit is configured to enable the selective use of each resonant circuit.

Receiving coil 13 and resonant capacitor 14 may be connected in series and known as resonant circuit that is "series-resonant." The coils 13 of the resonant circuit may receive power from a time-varying magnetic field generated by transmitter 2 to produce an AC output. The inductance of the receiving coil 13 and capacitance of the resonance capacitor 14 may affect the resonant frequency of the receiver. Moreover, the receiving coil 13 and resonance capacitor 14 may be selected so as to resonate at the operating frequency of the transmitter 2 or any other suitable frequency. In some embodiments the receiver 3 may be tuned outside of the transmitter frequency to enable active tuning in the receiver 3 to bring the IPT system into tune. Other considerations, such as the dimensions of the receiver or device in which the receiver is used or the required power, may also influence the type and size of the receiving coil 13 and resonant capacitor 14 used in the receiver 3.

The receiver 3 can further include a controller 16. The controller 16 may be connected to some or all parts of the inductive power receiver 3. The controller 3 may be configured to receive inputs from various components of the inductive power receiver 3 and produce outputs that control the operation of various components. The controller 3 may be implemented as a single unit or multiple harmonious units in communication with one another. For example, the receiver controller 16 may be one or more of a microprocessor, microcontroller, programmable logic controller, field programmable gate array (FPGA), or similar controller that may be programmed to perform different computational tasks depending on the requirements of the receiver 3. Controller 16 may be configured to control specific aspects of the receiver 3 such as power regulation, coil tuning, and/or communication with other computational devices in the receiver 3 or even in the power transmitter 2. The controller 16 may be further configured to selectively enable one or more receiver resonant circuits in a system with multiple resonant circuits.

In some embodiments it may be desirable for an IPT receiver to have the ability to regulate power supplied to the load to thereby facilitate the receiver to, for example, pick-up power from an uncontrolled magnetic field or to allow two or more receivers to independently receive power from the same magnetic field. However, it may be desirable that the regulator be efficient in order to minimize heat production and current flow ability. Further, it may be advantageous that the regulator have a minimal part count in order to reduce the require circuit board real estate and manufacturing cost. Any of a variety of power regulation circuits (not shown) may be constructed as part of the power receiving circuitry 8, the rectification circuitry 9, or a combination thereof.

One effective and simple implementation of a regulator is a synchronous rectifier combined with a switch mode DC-DC converter. However a potential disadvantage of DC-DC converters for at least some applications is an additional inductor that may be required for high loading and the introduction of additional switching losses associated with the DC-DC conversion. Some IPT system embodiments may mitigate the requirement for an additional regulator after the rectifier, and also therefore also mitigate the requirement for any further external inductors. In such embodiments, power loss in the IPT receiver may be reduced and the manufacturing cost of the receiver may also be reduced.

Figure 1C:
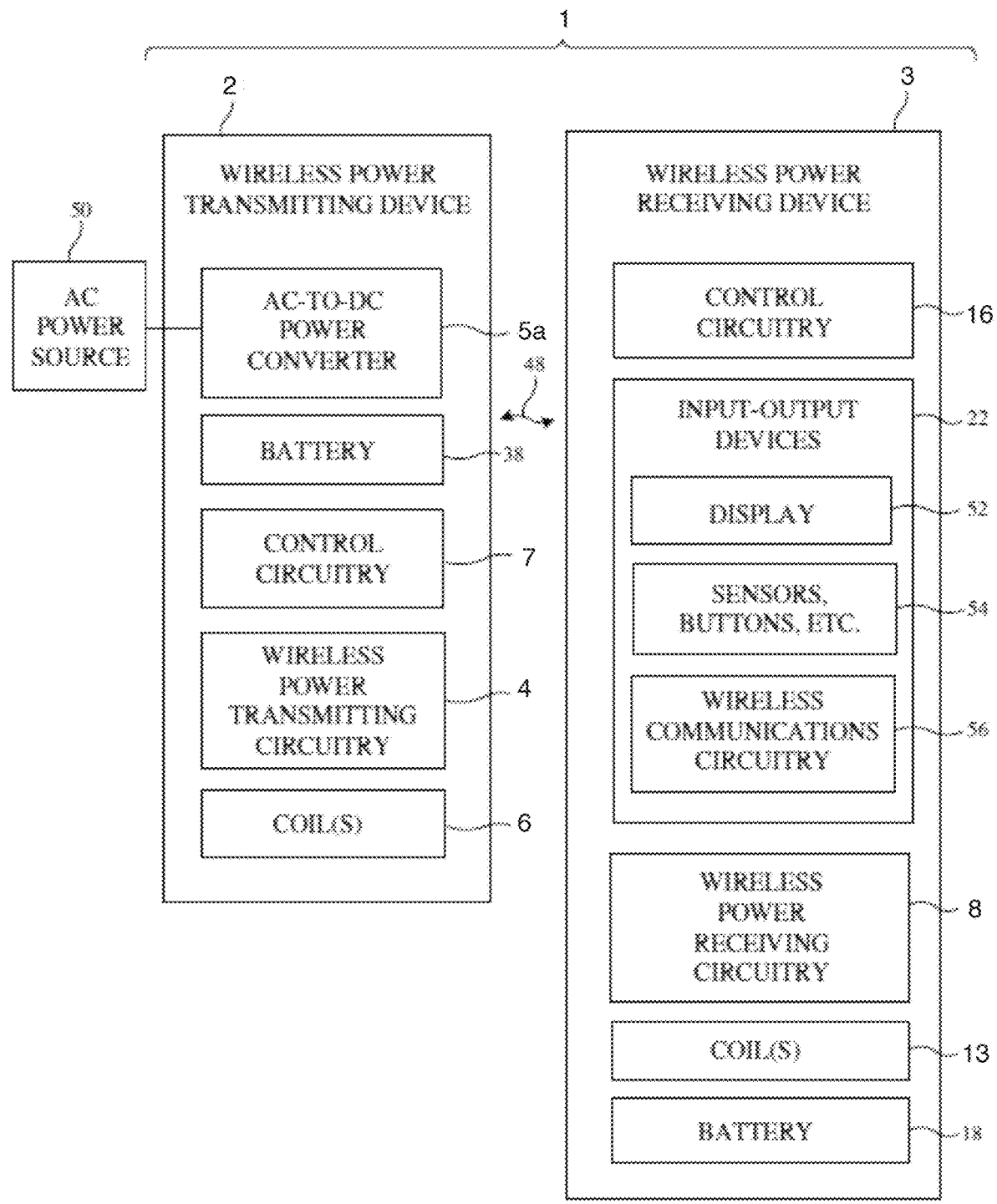
FIG. 1C shows an alternative representation of an IPT system.

An alternative embodiment of an illustrative wireless power system is shown in FIG. 1C, which uses like reference numbers to the embodiment above as appropriate. As shown in FIG. 1C, a wireless power system 1 can include a wireless power transmitting device 2 (which may also be referred to in some instances as an inductive power transmitter) and one or more wireless power receiving devices such as wireless power receiving device 3 (which may also be referred to in some instances as an inductive power receiver). Device 2 may be a stand-alone device such as a wireless charging mat, may be built into furniture, laptop or tablet computers, cellular telephones or other electronic devices, or may be other wireless charging equipment. Device 3 may be a portable electronic device such as a wristwatch, a cellular telephone, a tablet computer, an electronic pencil or stylus, or other electronic equipment. Illustrative configurations in which device 2 is a tablet computer or similar electronic device and in which device 3 is an electronic accessory that couples with the tablet computer or similar electronic device during wireless power transfer operations may sometimes be considered illustrative. Illustrative configurations in which device 2 is a mat or other equipment that forms a wireless charging surface and in which device 3 is a portable electronic device or electronic accessory that rests on the wireless charging surface during wireless power transfer operations may also be considered illustrative.

During operation of system 1, a user may place one or more devices 3 on or near the charging region of device 2. Power transmitting device 2 may be coupled to a source of alternating-current voltage such as alternating-current power source 50 (e.g., a wall outlet that supplies line power or other source of mains electricity), has a battery such as battery 38 for supplying power, and/or is coupled to another source of power. A power converter such as AC-DC power converter 5a can be included to convert power from a mains power source or other AC power source into DC power that is used to power control circuitry 7 as well as other circuitry in device 12. During operation, control circuitry 7 uses wireless power transmitting circuitry 4 and one or more coils 6 coupled to circuitry 4 to generate an alternating magnetic field and to transmit alternating-current wireless power signals 48 to device 34 and thereby convey wireless power to wireless power receiving circuitry 8 of device 3.

Power transmitting circuitry 4 may include switching circuitry (e.g., transistors in an inverter circuit) that are turned on and off based on control signals provided by control circuitry 7 to create AC current signals through appropriate coils 6. As the AC currents pass through a coil 6 that is being driven by the switching circuitry, a time-varying magnetic field (wireless power signals 48) or "flux" is generated, which may be received by one or more corresponding coils 13 electrically connected to wireless power receiving circuitry 8 in electronic device 3. If the time-varying magnetic field is magnetically coupled to coil 13, an AC voltage is induced and a corresponding AC currents flows in coil 13. Rectifier circuitry in power receiving circuitry 8 can convert the induced AC voltage in the one or more coils 13 into a DC voltage signals for powering device 3. The DC voltages are used in powering components in device 3, for example, a display 52, touch sensor components and other sensors 54 (e.g., accelerometers, force sensors, temperature sensors, light sensors, pressure sensors, gas sensors, moisture sensors, magnetic sensors, etc.), wireless communications circuitry 56, audio components, and other components (e.g., input-output devices 22 and/or control circuitry 16) and/or may be used to charge an internal battery 18 in device 3, or to charge other devices, either wired or wirelessly.

As mentioned above, devices 2 and 3 may include control circuitry 7 and 16. Control circuitry 42 and 20 may include storage and processing circuitry such as analogue circuitry, microprocessors, power management units, baseband processors, digital signal processors, field-programmable gate arrays, microcontrollers, application-specific integrated circuits with processing circuits and/or any combination thereof. Control circuitry 7 and 16 may be configured to execute instructions for implementing desired control and communications features in system 1. For example, control circuitry 7 and/or 16 may be used in sensing for foreign or other non-receiver objects (e.g., metallic objects such as coins or RFID tags within electronic devices), determining power transmission levels, processing sensor data, processing user input, processing other information such as information on wireless coupling efficiency from power transmitting circuitry 4, processing information from power receiving circuitry 8, using information from power transmitting circuitry 4 and/or 8 such as signal measurements on output circuitry in circuitry 4 and other information from circuitry 4 and/or 8 to determine when to start and stop wireless charging operations, adjusting charging parameters such as charging frequencies, coil assignments in a multi-coil array, and wireless power transmission levels, and performing other control functions. Control circuitry 7 and/or 16 may be configured to perform these operations using hardware (e.g., dedicated hardware or circuitry) and/or software (e.g., code that runs on the hardware of system 1). Software code for performing these operations is stored on non-transitory computer readable storage media (e.g., tangible computer readable storage media). The software code may sometimes be referred to as software, data, program instructions, instructions, or code. The non-transitory computer readable storage media may include non-volatile memory such as non-volatile random-access memory (NVRAM), one or more hard drives (e.g., magnetic drives or solid state drives), one or more removable flash drives or other removable media, other computer readable media, or combinations of these computer readable media or other storage. Software stored on the non-transitory computer readable storage media may be executed on the processing circuitry of control circuitry 7 and/or 16. The processing circuitry may include application-specific integrated circuits with processing circuitry, one or more microprocessors, or other processing circuitry.

Device 2 and/or device 3 may be configured to communicate wirelessly with one another. Devices 2 and 3 may, for example, have wireless transceiver circuitry in control circuitry 7 and 16 (and/or wireless communications circuitry such as wireless communication circuitry 56 of FIG. 1) that allows wireless transmission of signals between devices 2 and 3 (e.g., using antennas that are separate from coils 6 and 13 to transmit and receive unidirectional or bidirectional wireless signals, using coils 6 and 13 to transmit and receive unidirectional or bidirectional wireless signals, etc.). For example, device 2 and/or device 3 may communicate using in-band communications injected or combined into the wireless power signals 48 such as proposed in the Wireless Power Consortium Qi specification, which is incorporated herein by reference. Alternatively, a separate Bluetooth, RFID, NFC, Zigbee, WiFi, RF or other communication system may be employed.

Figure 2:
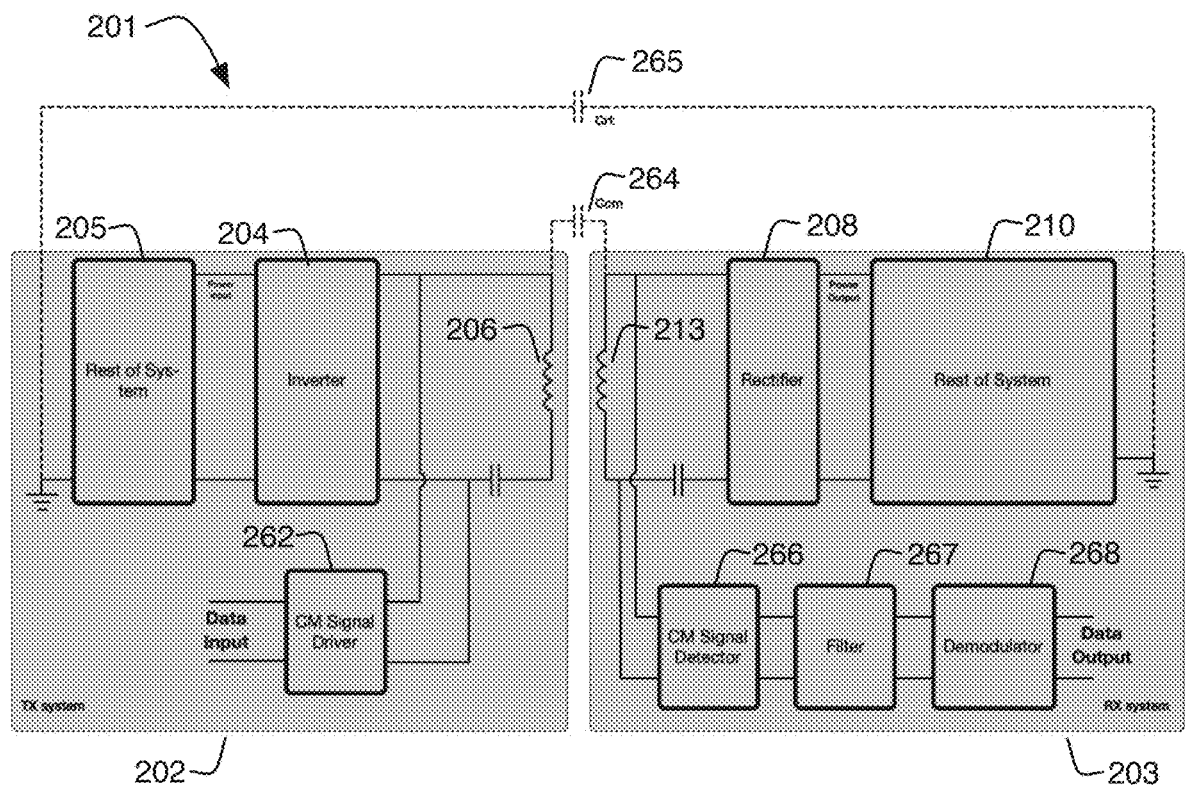
FIG. 2 illustrates an IPT system that incorporates a common mode communication channel.

In some embodiments, a common mode communication channel may be used for communication between wireless power transmitter 2 and wireless power receiver 3. FIG. 2 illustrates an inductive power transfer system 201 that incorporates a common mode communication channel. IPT system 201 may include an IPT transmitter 202 and an IPT receiver 203, both of which may be constructed generally as described above. Transmitter 202 can include a system 205 (generally corresponding to the power supply components discussed above) that provide power input to an inverter 204, which may be used to supply an AC voltage and current to transmit coil 206. The AC current flowing through transmit coil 206 may induce a corresponding AC current in receiver coil 213, which is part of transmitter 203. This induced AC current (and the associated voltage) may be received by rectifier 208, converted into a DC voltage (and current) that may be used to power a load 210.

In addition to the components discussed above, IPT transmitter 202 may include common mode signal driver 262, which may receive a data input corresponding to data that is intended to be transmitted to the IPT receiver 203. This data input signal may come from any of a variety of sources, for example, IPT transmitter controller 7 (although other data sources may also be used as needed for a particular implementation). Common mode signal driver 262 may produce a voltage and/or current signal that may be injected into transmit coil 206 using any suitable modulation scheme, including, for example, amplitude modulation, frequency modulation, phase modulation, etc.

The modulated output of common mode signal driver 262 provided to transmit winding 206 may be coupled to the receiver 203 by the common mode coupling capacitance 264 between transmit coil 206 and receiver coil 213. Common mode return path capacitance 265 may provide the return path for this signal. It will be appreciated that these capacitances are not necessarily discrete capacitors, but rather capacitances that are inherent results of the physical construction of windings 206 and 213. In some embodiments one or both of windings 206 and/or associated structures of transmitter 202 and/or receiver 203 may be constructed in such a way as to optimize this common mode capacitance as desired to facilitate common mode communication between the transmitter and receiver.

To detect the transmitted common mode signal, IPT receiver 203 may include a common mode signal detector 266 that detects a voltage and/or current signal that is coupled to the receiver coil 213 via common mode capacitance 264. The detected signal may optionally be provided to a filter 267 to produce a filtered signal that may then be demodulated by demodulator 268. Demodulator 268 may employ a demodulation scheme corresponding to the modulation scheme employed by common mode signal driver 262, thereby enabling demodulator 2689 to recover to recover a data output corresponding to the data input signal. This data output may be provided to various components of receiver 203, including, for example receiver controller 16, although other data destinations may be used as needed for a particular implementation.)

While it is desirable for an IPT transmitter and an IPT receiver to communicate information such as received power, states of charge, and so forth, to control wireless power transfer, it is noted that these communication techniques need not involve the transmission of personally identifiable information. Out of caution, it is also noted that to the extent that any implementation of this charging technology involves the use of personally identifiable information over an IPT system, implementers should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Figure 3:
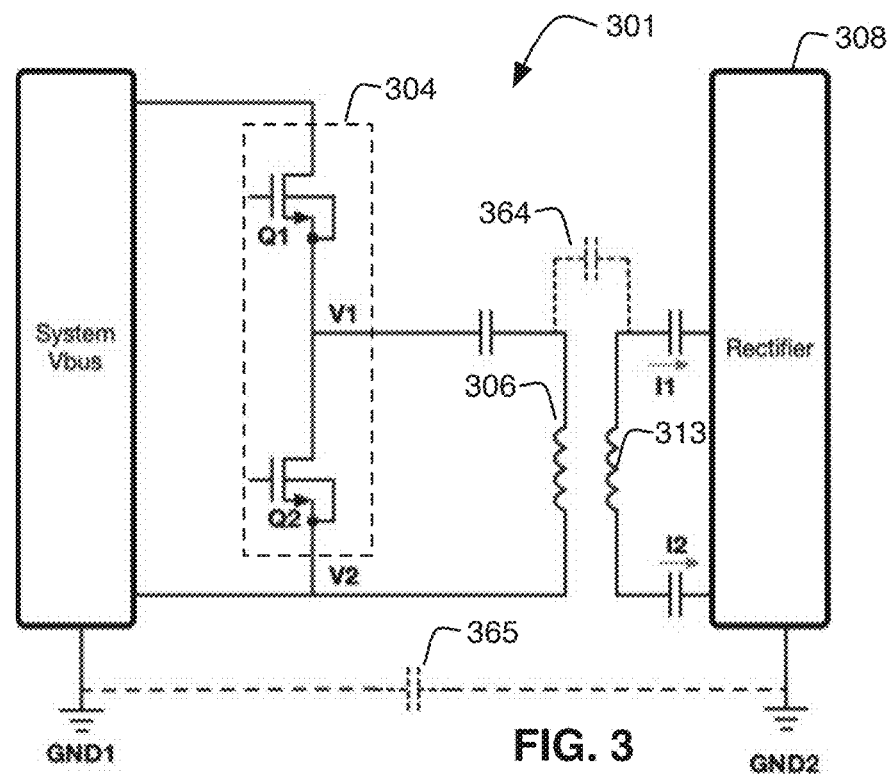
FIG. 3 illustrates an IPT system with a common mode communication channel, in which an inverter serves as both the power source and the common mode signal driver.

FIG. 3 illustrates an IPT system 301 with a common mode communication channel, in which inverter 304 serves as both the power source and the common mode signal driver. In the illustrated embodiment, inverter 304 is a half bridge inverter made up of two switching devices Q1 and Q2, although it will be appreciated that a full bridge inverter or other topology could also be used. By turning on Q1 and turning off Q2, voltage V1 will be set to the system bus voltage. By turning off Q1 and turning on Q2, voltage V1 will be equal to voltage V2 (and also equal to zero). Alternately switching Q1 and Q2 thus provides a square wave having an amplitude equal to the system bus voltage.

This square wave may be coupled to transmitter coil 306 which will produce an AC current through transmitter coil 306 that will induce a corresponding current and voltage in receiver coil 313.

The duty cycle of switch Q1 (i.e., the ratio of the on time for Q1 to the total switching cycle) will determine the amount of power delivered to transmitter coil 306, and thus to the receiver 313. More specifically, when Q1 has a duty cycle of 0 (meaning Q1 is never turned on and Q2 is always turned on), no power is delivered. In this case, Q2 has a duty cycle of 1. As the duty cycle of Q1 increases, the duty cycle of Q2 decreases, as the total of the two duty cycles must equal one cycle of the switching frequency. Thus, as the duty cycle of switch Q1 increases, more power will be delivered, peaking at a duty cycle of 50%, where Q2 will also have a duty cycle 50% (meaning each switch is turned on for one half of the switching cycle. As the duty cycle of switch Q1 continues to increase beyond 50%, the power delivered will decrease, reaching zero when switch Q1 has a duty cycle of 100% and Q2 as a duty cycle of 0%. In this case, DC system bus voltage will be presented to transmitter coil 306. Because this is not an AC voltage/current, no corresponding voltage/current will be induced in receiver coil 313. Thus, it will be appreciated that for any duty cycle D of switch Q1, the same level of power will be delivered at a duty cycle 1-D for switch Q1.

In the arrangement described above, because the voltage V1 alternates between a positive DC value (corresponding to the voltage of the system bus) and zero, the resulting AC voltage coupled to transmitter coil 306 will have a DC offset. The DC offset of this voltage will increase with increasing duty cycle of switch Q1. As described above, the power delivered to the receiver is determined by the duty cycle of switch Q1, with values less than 50% providing the same level of power as the complementary duty cycle greater than 50%. "Complementary" in this context means that the sum of a duty cycle and its complement will equal 100% (e.g., a 20% duty cycle will provide the same power to receiver 203 as an 80% duty cycle). However, the DC offset of the signal provided to transmitter coil 306 will be substantially different in the two cases. Moreover, capacitive coupling of this DC offset via the common mode capacitances 364 and 365 may be used to communicate data through the common mode channel as described above. More specifically, for a given power level, switch Q1 may alternate between duty cycle D and complementary duty cycle 1-D to produce a common mode voltage that transitions between two different voltages. This common mode voltage will be coupled to the receiver side via the common mode capacitance 364, and may be detected and decoded as described above to receive data. In some embodiments, the common mode capacitance may have a value on the order of 10 pF, although the specific value of this common mode capacitance will be determined by the particulars of construction of a given embodiment.

For embodiments that use the inverter duty cycle to provide the common mode data transmission, it may be desirable to limit the range of duty cycles over which the inverter operates, to ensure that sufficient dynamic range is available for data communication. For example, in some embodiments, it may be desirable for the system to provide maximum rated power at a high side switch (i.e., Q1) duty cycle of 20-25%. Thus, when operating at maximum rated power, the high side switch can alternate between 20-25% and 75-80% duty cycle to modulate the common mode voltage for data transmission. If, on the other hand, the system were designed to provide maximum rated power at a duty cycle of 40%, while providing maximum power, the system would alternate between duty cycles of 40% and 60% which would result in a lower difference in the two common mode voltages, which would be harder to detect and demodulate and would be more susceptible to noise and interference.

Figure 4:
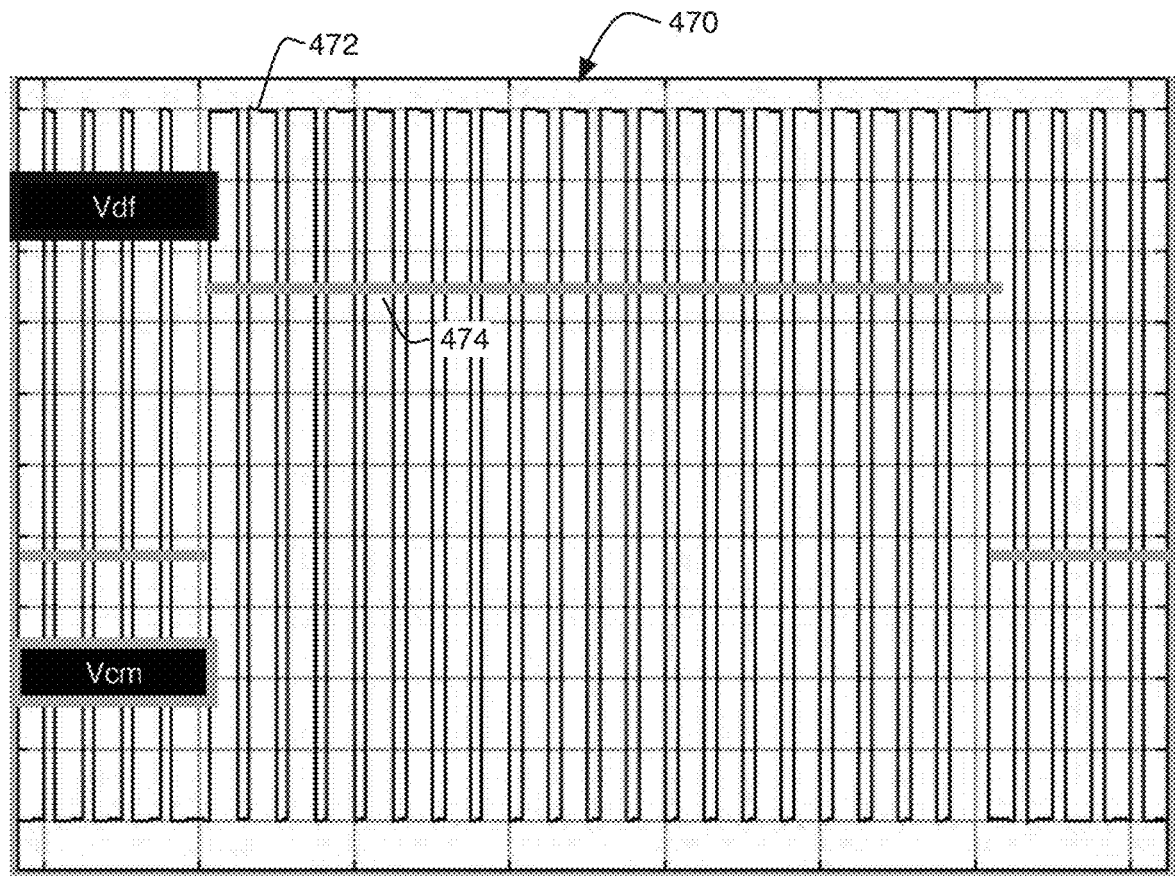
FIG. 4 illustrates certain waveforms of an IPT system with a common mode communication channel.

With further reference to FIG. 3 and also with reference to FIG. 4, there may be understood to be two relevant voltages and two relevant currents. The peak differential mode voltage Vdf (472) may equal V1-V2, and the instantaneous differential mode voltage will alternate between V1 and V2 according to the switching of switches Q1 and Q2. The average common mode voltage Vcm (474) will be given by the average of V1 and V2, i.e., (V1+V2)/2, and the instantaneous value of the common mode voltage Vcm will be determined by the duty cycle D, with the complementary duty cycle 1-D providing a different common mode voltage. With respect to the illustrated currents I1 and I2, the differential mode current (I1-I2) will determine the power delivered to the load, while the common mode current (I1+I2)/2 will be determined according to the switching duty cycle, and may thus also encode the data sent over the common mode channel.

Figure 5:
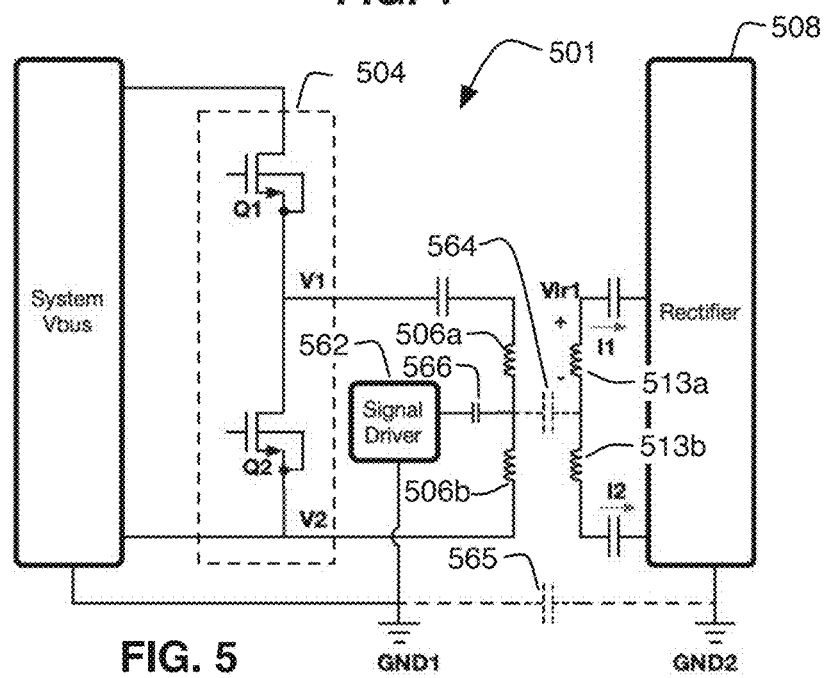
FIG. 5 illustrates an alternative embodiment of an IPT system with a common mode communication channel.

FIG. 5 illustrates an alternative embodiment of an IPT system 501 with a common mode communication channel. IPT system 501 employs a split transmitter coil 506a/506b and a split receiver coil 513a/513b. Common mode capacitances 564 and 565 represent the capacitive coupling between these two split coils. The specific value of the common mode capacitance will vary according to the particular coil construction of a given embodiment. The transmitter of IPT system 501 employs an inverter 504 similar to that described above with respect to FIG. 3, although it will be appreciated that other inverter arrangements could also be employed. The transmitter of IPT system 501 also includes a signal driver 562 that may be capacitively coupled to the junction point of split transmitter coil 506a/506b by capacitor 566. The specific capacitance value may be determined based on the particulars of a given embodiment, and particularly the value of the common mode capacitance between the transmitter coil 506a/506b and the receiver coil 513a/513b. It may be desirable, for example, for coupling capacitor 566 to have sufficiently small capacitance to couple signal injector 562 to the coil at the common mode communication frequency while appearing as effectively an open circuit at the inductive power transfer frequency. To facilitate this, the common mode communication frequency may be significantly higher than the inductive power transfer frequency.

Signal driver 562 may be used to inject a common mode voltage and/or current signal into split transmitter winding 506a/506b. As discussed above, signal driver 562 may employ any suitable modulation scheme, including amplitude modulation, frequency modulation, etc. to encode the transmitted data on the injected signal. The injected signal will, via the capacitive common mode coupling, induce a corresponding signal in the split receiver coil 513, which may be sensed, (optionally) filtered, and demodulated as described above. The particular structure and circuitry of the signal driver 562 and the receiver side detection, (optional) filtering, and demodulation circuitry will be determined by application requirements and the modulation scheme employed. Depending on such particulars, these components may be implemented by discrete or integrated circuitry employing analog, digital, or hybrid circuits. In some embodiments, the modulation and demodulation may be performed by the respective transmitter controller 7 and receiver controller 16 or by other circuits and systems provided for that purpose.

Figure 6:
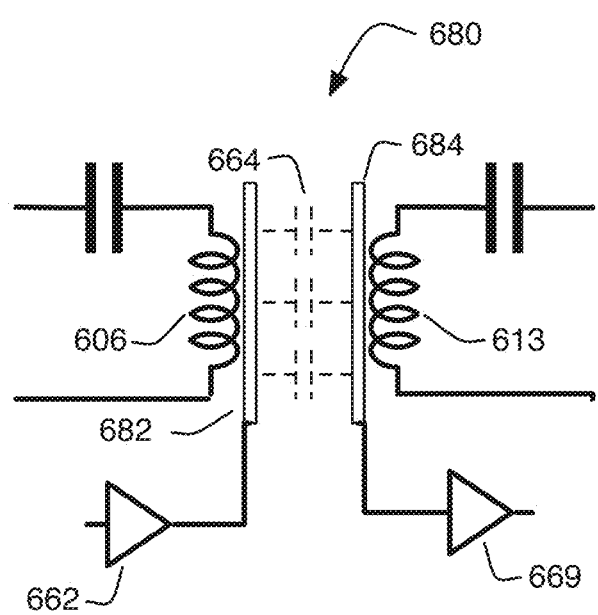
FIG. 6 illustrates a simplified schematic of an IPT system with a common mode data communication path that includes coupled E-shields associated with the transmitter and receiver coils.

FIG. 6 illustrates a simplified schematic of an IPT system 680 with a common mode data communication path that includes coupled electrical shields (E-shields) 682 and 684 associated with transmitter coil 606 and receiver coil 613, respectively. In some applications, transformers may be constructed with conductive electric field shielding between windings to block, minimize, or otherwise modify electric field coupling between the windings. The transmitter and receiver windings described herein are essentially air core transformers. In some embodiments, inductive power transfer systems may be constructed with E-shields to prevent electric field coupling into the respective windings. In such embodiments, the e-shields would not typically be physically positioned between the transmitter and receiver windings, as this could affect the magnetic coupling between the windings. Nevertheless, such shields may be provided with the transmitter winding and/or the receiver winding to prevent stray electric field coupling into the windings. In conventional applications, these E-shields may be grounded. However, in the illustrated embodiment, transmitter winding 606 may have an associated E-shield 682 and/or receiver winding 613 may have an associated E-shield 684 that are left ungrounded. These E-shields may be capacitively coupled by common mode capacitance 664. A signal driver 662 may be coupled to E-shield 682 of transmitter coil 606. A signal detector, (optional) filter, and demodulator circuit 669 may be coupled to E-shield 684 associated with receiver coil 613. As a result, driver 662 may induce a common mode signal that is capacitively coupled to the receiver as described above.

Described above are various features and embodiments relating to common mode data transmission in inductive power transfer systems. In the illustrated embodiments, a common mode signal may be sent from an inductive power transmitter to an inductive power receiver. However, it will be appreciated that embodiments could also be constructed in which a common mode signal may be sent from an inductive power receiver to an inductive power transmitter. Such systems may be used in a variety of applications but may be particularly advantageous when used in conjunction with personal electronic devices such as smartphones, smart watches, tablet computers, laptop computers, and associated accessories. Additionally, although numerous specific features and various embodiments have been described, it is to be understood that, unless otherwise noted as being mutually exclusive, the various features and embodiments may be combined various permutations in a particular implementation. Thus, the various embodiments described above are provided by way of illustration only and should not be constructed to limit the scope of the disclosure. Various modifications and changes can be made to the principles and embodiments herein without departing from the scope of the disclosure and without departing from the scope of the claims.

The invention claimed is:

1. A wireless power transfer system comprising:
a wireless power transmitter, the wireless power transmitter further comprising:
 a transmitter coil;
 a power converter that is coupled to and drives the transmitter coil; and
 a common mode signal driver that uses common mode coupling to communicate a data input signal by injecting a common mode communication signal generated from the data input signal into the transmitter coil during wireless power transfer; and
a wireless power receiver, the wireless power receiver further comprising:
 a receiver coil magnetically coupled to the transmitter coil that receives power from the transmitter coil;
 converter circuitry coupled to the receiver coil that converts the received power to power a load; and
 receiver communication circuitry coupled to the receiver coil comprising a common mode signal detector that receives the common mode communication signal via the receiver coil.

2. The wireless power transfer system of claim 1 wherein the transmitter coil is a split coil and the common mode signal driver is coupled to a junction point of the split coil.

3. The wireless power transfer system of claim 1 further comprising an electrical shield configured to prevent stray electrical field coupling to the transmitter coil, wherein the common mode signal driver is coupled to the electrical shield.

4. The wireless power transfer system of claim 1 wherein the power converter is an inverter, and the common mode signal driver comprises a controller that drives the inverter with alternating complementary duty cycles that generate respective alternating common mode voltages that are the common mode communication signal.

5. The wireless power transfer system of claim 4 wherein the alternating complementary duty cycles are selected to provide sufficient dynamic range of the common mode communication signal for data communication.

6. The wireless power transfer system of claim 5 wherein the alternating complementary duty cycles are less than 25% and greater than 75%.

7. The wireless power transfer system of claim 6 wherein the alternating complementary duty cycles are less than 20% and greater than 80%.

8. The wireless power transfer system of claim 1 wherein the common mode signal detector is configured to detect a common mode current.

9. The wireless power transfer system of claim 1 wherein the common mode signal detector is configured to detect a common mode voltage.

10. The wireless power transfer system of claim 1 wherein the receiver communication circuitry further comprises:
 a filter that filters the common mode communication signal from the received power; and
 a demodulator that generates a data output from the filtered common mode communication signal.

11. The wireless power transfer system of claim 1 wherein the receiver coil is a split coil.

12. The wireless power transfer system of claim 1 further comprising an electrical shield configured to prevent stray electrical field coupling to the receiver coil, wherein the common mode signal detector is coupled to the electrical shield.

13. A wireless power receiver comprising:
a receiver coil magnetically coupled to a transmitter coil configured to receive power from a wireless power transmitter coil;
converter circuitry coupled to the receiver coil that converts the received power to power a load; and
receiver communication circuitry coupled to the receiver coil comprising a common mode signal detector configured to receive a common mode communication signal via the receiver coil.

14. The wireless power receiver of claim 13 wherein the receiver communication circuitry further comprises:

a filter that filters the common mode communication signal from the received power; and a demodulator that generates a data output from the filtered common mode communication signal.

15. The wireless power receiver of claim 13 wherein the receiver coil is a split coil.

16. The wireless power receiver of claim 13 further comprising an electrical shield configured to prevent stray electrical field coupling to the receiver coil, wherein the common mode signal detector is coupled to the electrical shield.

17. A wireless power transmitter comprising:

a transmitter coil;

a power converter that is coupled to and drives the transmitter coil; and a common mode signal driver that uses common mode coupling to communicate a data input signal to a wireless power receiver by injecting a common mode communication signal generated from the data input signal into the transmitter coil during wireless power transfer.

18. The wireless power transmitter of claim 17 wherein the transmitter coil is a split coil and the common mode signal driver is coupled to a junction point of the split coil.

19. The wireless power transmitter of claim 18 further comprising an electrical shield configured to prevent stray electrical field coupling to the transmitter coil, wherein the common mode signal driver is coupled to the electrical shield.

20. The wireless power transmitter of claim 18 wherein:

the power converter is an inverter;

the common mode signal driver comprises a controller that drives the inverter with alternating complementary duty cycles that generate respective alternating common mode voltages that are the common mode communication signal; and the alternating complementary duty cycles are selected to provide sufficient dynamic range of the common mode communication signal for data communication.

* * * * *